United States Patent [19]
Ueyanagi et al.

[11] Patent Number: 5,773,497
[45] Date of Patent: Jun. 30, 1998

[54] CROSSLINKING RESIN COMPOSITION

[75] Inventors: Kaoru Ueyanagi, Nobeoka; Masahiro Yamamoto, Yokohama, both of Japan

[73] Assignee: Asahi Kasei Kogyo Kabushiki Kaisha, Osaka, Japan

[21] Appl. No.: 704,748

[22] PCT Filed: Mar. 16, 1995

[86] PCT No.: PCT/JP95/00453

§ 371 Date: Sep. 16, 1996

§ 102(e) Date: Sep. 16, 1996

[87] PCT Pub. No.: WO95/25139

PCT Pub. Date: Sep. 21, 1995

[30] Foreign Application Priority Data

Mar. 16, 1994 [JP] Japan .................................. 6/045664
Mar. 16, 1994 [JP] Japan .................................. 6/045665

[51] Int. Cl.$^6$ .................................................. C08K 5/34
[52] U.S. Cl. ........................... 524/99; 525/100; 525/104; 525/438; 525/446; 528/40
[58] Field of Search ............................. 528/40; 525/100, 525/104, 438, 446; 524/99

[56] References Cited

U.S. PATENT DOCUMENTS

| | | |
|---|---|---|
| 4,032,487 | 6/1977 | Columbus . |
| 4,093,673 | 6/1978 | Chang et al. . |
| 4,485,130 | 11/1984 | Lampin et al. . |
| 4,576,999 | 3/1986 | Eckberg . |
| 4,640,967 | 2/1987 | Eckberg . |
| 5,026,793 | 6/1991 | Nakai et al. . |
| 5,202,441 | 4/1993 | Suhadolnik et al. . |
| 5,206,328 | 4/1993 | Okamura et al. . |
| 5,210,150 | 5/1993 | Prejean . |
| 5,292,827 | 3/1994 | Raleigh et al. ........................ 528/40 |
| 5,322,868 | 6/1994 | Valet et al. . |
| 5,338,799 | 8/1994 | Ohsugi et al. . |
| 5,411,996 | 5/1995 | Eckberg et al. ....................... 528/15 |

FOREIGN PATENT DOCUMENTS

| | | |
|---|---|---|
| 0389421 A1 | 9/1990 | European Pat. Off. . |
| 0427672 A1 | 5/1991 | European Pat. Off. . |
| 0483488 A1 | 5/1992 | European Pat. Off. . |
| 4020316 A1 | 1/1992 | Germany . |
| 62-187749 A | 8/1987 | Japan . |
| 2-058532 A | 2/1990 | Japan . |
| 2-173153 A | 7/1990 | Japan . |
| 4-018967 A | 1/1992 | Japan . |
| 4-093363 A | 3/1992 | Japan . |
| 4-370170 A | 12/1992 | Japan . |
| 6-299119 A | 10/1994 | Japan . |
| 2247461 | 3/1992 | United Kingdom . |

*Primary Examiner*—Melvyn I. Marquis
*Attorney, Agent, or Firm*—Pennie & Edmonds LLP

[57] ABSTRACT

Disclosed is a crosslinking resin composition comprising: (A) a carboxyl group-containing resin as a main agent, having a number average molecular weight of from 1,000 to 40,000 and an acid value of from 10 to 400 mg KOH/g; (B) a cyclic or chain silicone compound as a curing agent, having a number average molecular weight of from 350 to 8,000 and containing at least two epoxy groups in one molecule thereof, wherein the silicone compound is free of a silanol group, a hydrolyzable silyl group and a vinyl polymer structure, and wherein the silicone compound has a siloxy group-containing skeleton; and (C) a medium. The crosslinking resin composition of the present invention not only exhibits excellent storage stability, but is also capable of providing, upon being crosslinked, a cured resin having excellent gloss, weatherability, acid resistance, solvent resistance, water repellency and stain resistance. Therefore, the crosslinking resin composition can be advantageously used for providing various coating compositions, such as paints, and sealants.

10 Claims, No Drawings

CROSSLINKING RESIN COMPOSITION

BACKGROUND OF THE INVENTION

1. Field of the Invention

The present invention relates to a novel crosslinking resin composition. More particularly, the present invention is concerned with a novel crosslinking resin composition comprising: a carboxyl group-containing resin as a main agent; a cyclic or chain silicone compound as a curing agent, which contains at least two epoxy groups in one molecule thereof and which is free of a silanol group, a hydrolyzable silyl group and a vinyl polymer structure; and a medium. The crosslinking resin composition not only exhibits excellent storage stability, but is also capable of providing, upon being crosslinked, a cured resin having excellent weatherability, acid resistance, solvent resistance, stain resistance and surface smoothness. Therefore, the crosslinking resin composition of the present invention can be advantageously used for providing coating compositions, such as paints, sealants and the like.

2. Prior Art

Some vinyl polymers having alkoxysilyl groups at the terminals thereof and/or in side chains thereof and coating compositions containing the same are disclosed in, for example, Unexamined Japanese Patent Application Laid-Open Specification Nos. 54-36395 (corresponding to U.S. Pat. No. 4,334,036), 54-40893 and 54-123192. These vinyl polymers have excellent weatherability and acid resistance. However, these vinyl polymers have a problem with their stability. In use, these vinyl polymers having alkoxy silyl groups are used as a main agent in combination with a curing catalyst, and the curing of the vinyl polymer is performed by crosslinking through hydrolysis condensation of the alkoxy silyl groups with the water contained in the air. Therefore, when the vinyl polymer contains water as a contaminant, the storage stability of the vinyl polymer is likely to be lower. Further, when this vinyl polymer is formulated into a paint by using a pigment, the storage stability of the paint may be adversely affected by the water contained in the pigment.

U.S. Pat. No. 5,210,150 discloses a melt-moldable, moisture-curing adhesive using a reaction product of a vinyl resin having carboxylic acid groups with an epoxy silane. As examples of epoxy silanes, glycidoxypropyltrimethoxysilane and β-(3,4-epoxycyclohexyl)ethyltrimethoxysilane are described. These epoxy silanes have only one epoxy group in one molecule thereof, so that a curing reaction does not proceed between such epoxy silanes and carboxyl groups. Further, since the epoxy silane capable of reacting with a vinyl resin having carboxylic acid groups contains hydrolyzable methoxysilyl groups, the above-mentioned reaction product inherently has poor storage stability. Furthermore, when the above-mentioned reaction product is formulated into a paint by using a pigment, the storage stability of the paint may be adversely affected by the water contained in the pigment.

British Patent No. 2247461 (corresponding to Unexamined Japanese Patent Application Laid-Open Specification No. 4-110350) discloses a curing resin comprising: (I) a polysiloxane resin comprising a reaction product of (A) a silane compound having at least one hydroxyl group and/or hydrolyzable group, which is directly bonded to the silicon atom thereof, with (B) a silane compound having at least one hydroxyl group and/or hydrolyzable group which is directly bonded to the silicon atom thereof and at least one epoxy group (thus, on the average, the polysiloxane has, per molecule thereof, at least one epoxy group and at least two hydroxyl groups and/or at least two hydrolyzable groups which are bonded to the silicon atom thereof); and (II) a resin having hydroxyl groups and carboxyl groups. The curing resin proposed in the above British patent has problems in that a silanol group which is formed by the above-mentioned direct bonding of the hydroxyl group to the silicon atom is highly susceptible to condensation. The resulting resin having such a silanol group has poor stability and, therefore, must be stored and handled with great care. The hydrolyzable group contained in the resin inherently has an adverse influence on the stability of the resin, although the susceptibility of the hydrolyzable group to hydrolysis and condensation is lower than that of the silanol group.

SUMMARY OF THE INVENTION

In these situations, the present inventors have made extensive and intensive studies with a view toward developing a crosslinking resin composition which not only has good storage stability and excellent curability, but also is capable of providing a cured resin still exhibiting excellent weatherability, excellent acid resistance and the like, which are characteristics of a cured silicone resin. As a result, it has been unexpectedly found that it is possible to obtain such a crosslinking resin composition having such excellent properties or characteristics by combining a specific, carboxyl group-containing resin having no highly hydrolyzable silyl group (alkoxysilyl group) therein with a specific compound containing Si atoms and at least two epoxy groups in one molecule thereof. The present invention has been completed, based on this novel finding.

According to the present invention, there is provided a novel crosslinking resin composition comprising:

(A) a carboxyl group-containing resin as a main agent, having a number average molecular weight of from 1,000 to 40,000 and an acid value of from 10 to 400 mg KOH/g;

(B) a cyclic or chain silicone compound as a curing agent, having a number average molecular weight of from 350 to 8,000 and containing at least two epoxy groups in one molecule thereof, wherein the silicone compound is free of a silanol group, a hydrolyzable silyl group and a vinyl polymer structure, and wherein the silicone compound has a siloxy group-containing skeleton represented by a formula selected from the group consisting of the following formulae (I) and (II):

wherein n is an integer of from 3 to 20, and

(C) a medium.

DETAILED DESCRIPTION OF THE INVENTION

In the present invention it is preferred that the resin as component (A) be at least one resin selected from a acrylic resin, a polyester resin and a fluorine-containing resin.

The resin component (A) has a number average molecular weight of 1,000 to 40,000, preferably 2,000 to 40,000. When the number average molecular weight of the resin is less than 1,000, the properties of a cured resin obtained from the crosslinking resin composition become poor. When the molecular weight is more than 40,000, the viscosity of the resin is excessively high, so that it becomes difficult to handle the resin. The number average molecular weight of the resin can be measured by gel permeation chromatography (GPC), as described below.

The resin (A) has an acid value of 10 to 400 mg KOH/g, preferably 20 to 300 mg KOH/g. When the acid value is less than 10 mg KOH/g, it becomes difficult for the resin composition to be cured satisfactorily, so that a cured resin having satisfactory properties cannot be obtained. When the acid value is more than 400 mg KOH/g, the ratio of carboxyl groups not participating in the crosslinking reaction becomes large, or the crosslink density becomes excessively high, so that, not only do the properties of a cured resin obtained from the resin composition become poor, but the viscosity of the resin itself also becomes excessively high, so that the solvent usable for the resin is limited. The acid value of the resin is measured according to the method of ASTM-1638.

The resin component (A) may contain hydroxyl groups therein. The hydroxyl group reacts with the epoxy groups of the silicone compound component (B), thereby taking part in the crosslink-curing. Furthermore, when the resin contains hydroxyl groups, there are advantages in that, when the resin composition of the present invention is formulated into a paint by using a pigment, not only can the pigment be uniformly dispersed in the resin composition, but also excellent adhesion of the paint to a substrate is achieved. When the resin component (A) contains hydroxyl groups, it is preferred that the resin contain hydroxyl groups in the range of not more than 300 mg KOH/g in terms of the hydroxyl value of the resin. When the hydroxyl value is more than 300 mg KOH/g, the properties of a cured resin obtained from the resin composition become poor. The hydroxyl value is more preferably not more than 200 mg KOH/g. Further, it is preferred that the sum of the respective amounts of carboxyl groups and hydroxyl groups in the resin is not more than 400 mg KOH/g in terms of the sum of the acid value and the hydroxyl value of the resin. The hydroxyl value of the resin can be measured according to the method of ASTM-1638.

In view of the intended main use of the crosslinking resin composition of the present invention as a material for coating compositions, paints, sealants and the like which can provide ultimate cured resins having high durability, it is preferred that the base resin for the carboxyl group-containing resin component (A) be selected from an acrylic resin, a polyester resin and a fluorine-containing resin. These resins can be used individually or in combination.

The carboxyl-containing acrylic resin usable as component (A) can be prepared by copolymerizing an acrylic monomer or a vinyl monomer with a carboxyl-containing comonomer, such as acrylic acid, methacrylic acid and maleic acid. Examples of acrylic monomers and other vinyl monomers include methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, isobornyl (meth)acrylate, glycidyl (meth) acrylate, maleic anhydride, styrene and acrylonitrile. When it is desired to introduce hydroxyl groups into the acrylic resin, a hydroxyl-containing monomer is used as a comonomer in the copolymerization for obtaining an acrylic resin. Examples of hydroxyl-containing monomers include 2-hydroxyethyl (meth)acrylate, 2-hydroxypropyl (meth) acrylate, 3-hydroxypropyl (meth)acrylate and 3-hydroxybutyl (meth)acrylate.

The acrylic resin can be produced by copolymerizing a mixture of the above-mentioned vinyl monomers in the presence or absence of a solvent by using a polymerization initiator or ionizing radiation as a means for initiating the polymerization. In the copolymerization, the addition of a vinyl monomer to the reaction system can be conducted in a batchwise and/or continuous manner, depending on the copolymerizability and the reactivity (such as, heat generation capacity) of the vinyl monomer.

As the polymerization initiator, a water-soluble or oil-soluble polymerization initiator can be appropriately selected, depending on the mode of the polymerization process, the properties of the initiator and the like.

Examples of oil-soluble initiators include azo compounds, such as azobisisobutyronitrile, 2-2'-azobis(2,4-dimethyl valeronitrile); peroxyesters, such as t-butyl peroxypivalate and t-butyl peroxyisobutylate; diacyl peroxides, such as octanoyl peroxide, lauroyl peroxide and benzoyl peroxide; dialkyl peroxydicarbonates, such as diisopropyl peroxydicarbonate; and dialkyl peroxides.

Examples of water-soluble initiators include persulfates, such as potassium persulfate, hydrogen peroxide and redox initiators comprising a combination of a persulfate or hydrogen peroxide with a reducing agent, such as sodium hydrogensulfite or thiosulfate; inorganic initiators comprising a combination of a persulfate or hydrogen peroxide with a small amount of iron, a ferrous salt, silver nitrate and the like; and organic initiators, such as dibasic acid peroxides (e.g., disuccinic acid peroxide, diglutaric acid peroxide, monosuccinic acid peroxide) and a dibasic acid salt of azobisisobutylamizine.

The amount of the initiator is selected depending on the type of the initiator, the copolymerization reaction conditions and the like. The amount of the initiator is generally in the range of from 0.005 to 8% by weight, preferably from 0.05 to 5% by weight, based on the total weight of the monomers used.

The polymerization method is not specifically limited by the foregoing examples, and various methods, such as bulk polymerization, suspension polymerization, emulsion polymerization and solution polymerization, can be employed. From the viewpoint of the stability of the polymerization operation, solution polymerization using an organic solvent is preferred.

Examples of solvents include aromatic hydrocarbons, such as benzene, toluene and xylene and the like; esters, such as ethyl acetate, propyl acetate, butyl acetate, amyl acetate, 2-ethylbutyl acetate, methoxybutyl acetate, methylisoamyl acetate, 2-ethylhexyl acetate, cyclohexyl acetate, methylcyclohexyl acetate, methyl propionate, ethyl propionate, propyl propionate, butyl propionate, isoamyl propionate and the like; alcohols, such as ethanol, propanol, butanol, pentanol and the like; ketones, such as acetone, methyl ethyl ketone, diethyl ketone, methyl propyl ketone, methyl butyl ketone, methyl amyl ketone, methyl isobutyl ketone and the like; ethers, such as dipropyl ether, dibutyl ether, dioxane, ethylene glycol dimethyl ether, ethylene glycol diethyl ether, ethylene glycol dipropyl ether, ethylene glycol dibutyl ether, diethylene glycol dimethyl ether, diethylene glycol diethyl ether, ethylene glycol monopropyl ether, ethylene glycol monobutyl ether, ethylene glycol monoethyl acetate, diethylene glycol monomethyl ether, diethylene glycol monoethyl ether, ethylene glycol monoacetate, ethylene glycol diacetate, propylene glycol monomethyl ether, propylene glycol monoethyl ether, propylene glycol monopropyl ether, propylene glycol monobutyl ether, dipropylene glycol monomethyl ether, propylene glycol monomethyl ether acetate, propylene glycol dimethyl ether, propylene glycol diethyl ether, dipropylene glycol monoethyl ether and the like. Chain transfer agents, such as butyl mercaptan, dodecyl mercaptan, and a halogenated hydrocarbon, can also be used as the solvent.

The polymerization temperature is varied, depending on the type and amount of the initiator used, and can be selected in the range of from room temperature to 150° C. The molecular weight of a copolymer to be synthesized can be controlled by selecting the type and amount of the initiator and the polymerization temperature.

Examples of polyester resins which can be used as component (A) include conventional polyester resins obtained from an acid and an alcohol. Examples of acids include phthalic anhydride, phthalic acid, tetrahydrophthalic anhydride, hexahydrophthalic anhydride, maleic acid, succinic acid, adipic acid, trimellitic acid anhydride and the like. Examples of alcohols include ethylene glycol, propylene glycol, butane diol, trimethylolpropane, glycerin and the like. The acid value of the polyester resin can be controlled by regulating the ratio of the polybasic acid to the polyhydric alcohol.

The carboxyl group-containing fluoro-resin usable as component (A) can be prepared by copolymerizing a fluoro-monomer, such as tetrafluoroethylene, chlorotrifluoroethylene, difluoroethylene, trifluorochloroethylene, dichlorotrifluoropropylene and the like, with a comonomer, such as acrylic acid, methacrylic acid and maleic acid the like. When it is desired to introduce a hydroxyl group into the fluoro-resin, the introduction can be performed by using a hydroxyl group-containing monomer. Examples of hydroxyl group-containing monomers include vinyl alcohol, allyl alcohol, allyloxyethanol, 4-hydroxybutylvinyl ether and the like.

The silicone compound component (B) is a cyclic or chain silicone compound which contains at least two epoxy groups in one molecule thereof on the average, which epoxy group is capable of reacting with the carboxyl group of component (A) and with an optional hydroxy group of component (A). The silicone compound (B) is free of a silanol group, a hydrolyzable silyl group and a vinyl polymer structure, and has a siloxy group-containing skeleton represented by a formula selected from the group consisting of the following formulae (I) and (II):

wherein n is an integer of from 3 to 20, and

The number average molecular weight of the silicone compound (B) is from 350 to 8,000, preferably from 360 to 5,000, more preferably from 450 to 3,000. The number average molecular weight is measured by GPC.

When a vinyl polymer containing an epoxy group and a terminal or pendant hydrolyzable silyl group is employed in place of the above-mentioned silicone compound (B), the resin composition is unstable due to the presence of the hydrolyzable silyl group in the vinyl polymer. Further, the vinyl polymer is difficult to handle because it has a high molecular weight.

When a conventional, epoxy group-containing silane coupling reagent is employed in place of the silicone compound (B), satisfactory curing of the resin composition cannot be achieved, because the conventional silane coupling reagent has only one epoxy group per molecule on the average and this amount of epoxy groups is too small to satisfactorily cure the resin composition by the reaction thereof with carboxyl groups of resin (A). Further, some silane coupling reagents have a low boiling point and, therefore, the use of the silane coupling agent has a disadvantage in that, when curing with such a silane coupling reagent is conducted at high temperatures, the coupling reagent is volatilized before a crosslinking reaction occurs, so that the silane coupling reagent cannot be fully and effectively utilized.

When the silicone compound component (B) contains a silanol group or a hydrolyzable silyl group, the resin composition has poor stability. On the other hand, when the number of epoxy groups in one molecule of the silicone compound component (B) is less than two on the average, a satisfactory curing of the resin composition cannot be achieved, so that the mechanical properties of the ultimate cured resin composition are poor.

When the silicone compound (B) has no functional groups capable of reacting with the carboxyl group and optional hydroxyl group of the resin (A) other than the epoxy groups, it is preferred that component (B) contain at least 2.1 epoxy groups per molecule thereof on the average.

The silicone compound component (B) is not specifically limited as long as the silicone compound is a cyclic or chain silicone compound containing at least two epoxy groups per molecule thereof on the average, wherein the silicone compound is free of a silanol group, a hydrolyzable silyl group and a vinyl polymer structure, and wherein the silicone compound has a siloxy group-containing skeleton represented by a formula selected from the group consisting of the formulae (I) and (II). However, the number average molecular weight of the silicon compound (B) is generally in the range of from 350 to 8,000. A silicone compound (B) having a number average molecular weight of less than 350 is difficult to synthesize and is not easily commercially available. When the number average molecular weight of the silicone compound as component (B) is larger than 8,000, it becomes difficult to handle component (B) because of its high viscosity. Further, in this case, a problem also arises in that the reactivity between the carboxyl group of component (A) (hereinafter, occasionally referred to as "[functional group A]") and the epoxy group of component (B) (hereinafter, occasionally referred to as "[functional group B]") is lowered.

The silicone compound component (B) may comprise either a single type of silicone compound or a mixture of two or more types of silicone compounds.

Specific examples of component (B) include a cyclic silicone compound represented by the following formula (III):

wherein m is an integer of from 3 to 16, each $R^1$ independently represents a $C_1$–$C_{10}$ alkyl group and each Ep independently represents a group represented by a formula selected from the group consisting of the following formulae (1), (2) and (3):

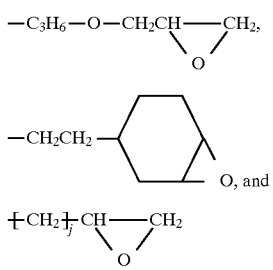

wherein j is an integer of from 2 to 6; and a chain silicone compound represented by the following formula (IV):

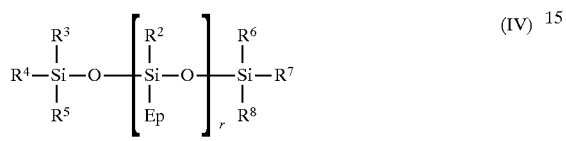

wherein each of $R^2$ to $R^8$ independently represents a $C_1$–$C_{10}$ alkyl group, each Ep is as defined above for formula (III) and r is an integer of from 3 to 16.

These compounds may be employed individually or in combination.

A further example of the silicone compound component (B) is a silicone compound obtained by a hydrosilylation reaction of a Si—H-containing silane compound with an epoxy group-containing compound having a carbon-carbon double bond, using a platinum catalyst or the like, wherein the Si—H-containing silane compound is represented by a formula selected from the group consisting of the following formulae (V), (VI) and (VII):

wherein each Y independently represents a hydrogen atom or a $C_1$–$C_{10}$ alkyl group, with the proviso that at least two Ys in one molecule of the Si—H-containing silane compound are hydrogen atoms, and q is an integer of from 2 to 10;

wherein each Y independently represents a hydrogen atom or a $C_1$–$C_{10}$ alkyl group, with the proviso that at least two Ys in one molecule of the Si—H-containing silane compound are hydrogen atoms, and p is an integer of from 3 to 20; and

wherein each Y independently represents a hydrogen atom or a $C_1$–$C_{10}$ alkyl group, with the proviso that at least two Ys in one molecule of the Si—H-containing silane compound are hydrogen atoms, and s is an integer of from 3 to 16.

The Si—H-containing silane compound may contain both of the structural units of formulae (V) and (VI) above.

Examples of epoxy group-containing compounds having a carbon-carbon double bond include allyl glycidyl ether, 5-epoxy-1-hexene, vinyl cyclohexene oxide and limonene oxide.

Alternatively, silicone compound (B) can also be obtained by hydrolyzing a bifunctional silane, such as methyldichlorosilane, represented by the formula $RHSiX_2$ (wherein R represents a $C_1$–$C_{10}$ alkyl group and X represents a halogen atom or a hydrolyzable group) to obtain a cyclic silane compound; and conducting a hydrosilylation reaction of the obtained cyclic silane compound with an epoxy group-containing compound having a carbon-carbon double bond in the presence of, for example, a platinum catalyst.

In conducting the hydrosilylation reaction of a Si—H-containing silane compound with an epoxy group-containing compound having a carbon-carbon double bond for introducing epoxy groups into the silane compound, other compounds having a carbon-carbon double bond may also be used in addition to the epoxy group-containing compound having a carbon-carbon double bond, as long as a silicone compound containing at least two epoxy groups per molecule on the average can be obtained.

Examples of other compounds having a carbon—carbon double bond include olefins, such as 1-hexene, 1-heptene, 1-octene, isobutene, 5-methyl-1-butene and cyclohexene; allyl esters, such as allyl acetate, allyl propionate and allyl 2-ethylhexanoate; allyl ethers, such as allyl methyl ether, allyl ethyl ether, allyl propyl ether, allyl hexyl ether, allyl cyclohexyl ether and allyl-2-ethylhexyl ether; (meth) acrylates, such as methyl (meth)acrylate, ethyl (meth) acrylate, butyl (meth)acrylate, 2-ethylhexyl (meth)acrylate, cyclohexyl (meth)acrylate and phenyl (meth)acrylate; carboxylic vinyl esters, such as vinyl acetate, vinyl propionate, vinyl butyrate, vinyl stearate and vinyl benzoate; vinyl ethers, such as methyl vinyl ether, ethyl vinyl ether, butyl vinyl ether, isobutyl vinyl ether and cyclohexyl vinyl ether; (meth)acrylonitrile; styrene; and crotonic ester.

Silicone compound (B) can also be obtained by a hydrosilyation reaction of a Si—H-containing silicone compound, such as 1,1,1,3,5,7,7,7-octamethyltetradisiloxane, 1,3,5,7-tetramethylcyclotetrasiloxane and 1,3,5,7,9-pentamethylcyclopentasiloxane, with an epoxy group-containing compound having a carbon—carbon double bond in the presence of, e.g., a platinum catalyst.

As a further example of silicone compound (B), 1,3-bis (3-glycidoxypropyl)-1,1,3,3-tetramethyldisiloxane can be mentioned.

Medium (C) of the crosslinking resin composition of the present invention is at least one compound selected from the group consisting of water and an organic solvent.

When a carboxyl group-containing resin as such is used as component (A), it is preferred to use an organic solvent solely as medium (C).

When a resin obtained by neutralizing a carboxylic group-containing resin with an amine compound is used as component (A), component (C) may be a medium comprised mainly of water, and the resultant crosslinking resin composition can be advantageously used as an aqueous crosslinking resin composition. When a medium comprised mainly of water, which also contains an organic solvent, is used as component (C), it is preferred that the weight ratio of the water to the organic solvent be in the range of from 100/0 to 50/50.

With respect to the type of the organic solvent as medium (C), there is no particular limitation, and a conventional organic solvent can be used. An organic solvent which has been used in synthesizing component (A) or component (B), as such, may be used as component (C). For example, a reaction mixture obtained by the synthesis of component (A), containing an organic solvent and component (A), as such, may be used as a mixture of components (A) and (C) as long as the use of such a mixture poses no particular problem in practice. The organic solvent as component (C) may be a mixed solvent. When a mixed organic solvent is used, it may be a mixture of a good solvent having a high dissolving ability for component (A) or component (B) and a poor solvent having a low dissolving ability for component (A) or component (B). When the crosslinking resin composition of the present invention is used as a coating material and a solvent having a boiling point of less than 120° C. is used solely as medium (C), it becomes difficult to obtain a coating having a smooth surface because of the high volatility of the solvent. On the other hand, when a solvent having a boiling point of 120° C. or more is used solely as medium (C), a problem is likely to occur in that a coating obtained from the resin composition has low dryability because of the low volatility of the solvent. From the viewpoint of achieving both good dryability and good properties of an ultimate coating, it is preferred that medium (C) be a mixture of a solvent having a boiling point of less than 120° C. and a solvent having a boiling point of 120° C. or more.

Examples of solvents having a boiling point of less than 120° C. include ethanol, propanol, butanol, dioxane, acetone, methyl ethyl ketone, methyl propyl ketone, diethyl ketone, methyl isobutyl ketone, methyl acetate, ethyl acetate, propyl acetate, isobutyl acetate, sec-butyl acetate, methyl propionate, ethyl propionate, hexane, heptane, benzene, toluene and cyclohexane.

Examples of solvents having a boiling point of 120° C. or more include isopentanol, hexanol, methylamyl alcohol, 2-ethylbutanol, cyclohexanol, methyl-n-butyl ketone, ethyl butyl ketone, dibutyl ketone, cyclohexanone, n-butyl acetate, amyl acetate, hexyl acetate, cyclohexyl acetate, n-octane, xylene, ethylbenzene, trimethylbenzene, n-butyl propionate, isoamyl propionate, butyl cellosolve, propylene glycol, ethylene glycol, methyl cellosolve, ethylene glycol dimethyl ether, ethylene glycol diethyl ether, ethylene glycol dipropyl ether, ethylene glycol dibutyl ether, diethylene glycol dimethyl ether, diethylene glycol diethyl ether, ethylene glycol monopropyl ether, ethylene glycol monobutyl ether, ethylene glycol monoethyl acetate, diethylene glycol monomethyl ether, diethylene glycol monoethyl ether, ethylene glycol monoacetate, ethylene glycol diacetate, propylene glycol monomethyl ether, propylene glycol monoethyl ether, propylene glycol monopropyl ether, propylene glycol monobutyl ether, propylene glycol monomethyl ether acetate, propylene glycol dimethyl ether, propylene glycol diethyl ether, dipropylene glycol monomethyl ether, dipropylene glycol monoethyl ether, diethylene glycol monomethyl ether and diethylene glycol monoethyl ether.

As mentioned above, when the medium comprised mainly of water is used, a resin obtained by neutralizing a carboxyl group-containing resin with an amine is used as component (A) in the aqueous crosslinking resin composition. When a carboxyl group (carboxylic acid group)-containing resin which is not neutralized with an amine is used as component (A), problems may arise in that some carboxyl group-containing resin used as component (A) have less compatibility with silicone compound (B) and that some silicone compounds (B), which are compatible with the carboxyl-containing resins, have poor solubility in water. By contrast, when a carboxyl group-containing resin which is neutralized with an amine is used as component (A) in combination with medium (C) comprised mainly of water, a uniform cured resin can be easily obtained. Further, in this case, the crosslinking resin composition obtained by mixing component (A), component (B) and component (C) provides a satisfactorily long period of time for which it can be used as a coating composition.

In the aqueous crosslinking resin composition of the present invention, the carboxyl group-containing resin component (A) has no alkoxysilyl group having high hydrolyzability, so that resin (A) has good stability, even when an aqueous medium is used as component (C). Further, since component (B) is a silicone compound, a cured resin obtained by a cross-linking reaction between component (A) and component (B) exhibits advantageous features which are characteristic of a cured silicone structure-containing resin. Furthermore, the aqueous crosslinking resin composition has various advantages derived from the fact that the composition is in an aqueous system.

When the carboxyl group-containing resin is neutralized with an amine, it is preferred that the amine be used in an amount equivalent to the amount of the carboxyl groups. However, the amount of the amine may be a little more than or a little less than the amount equivalent to the amount of the carboxyl groups, as long as the neutralized carboxyl group-containing resin component (A) has satisfactory solubility or dispersibility in water.

Examples of amine compounds, which can be used for neutralizing the carboxyl group-containing resin so as to achieve a good solubility and/or a good dispersibility in an aqueous medium, include ammonia, alkylamines and alkanolamines.

Examples of alkylamines include primary amines, secondary amines, tertiary amines and tetraalkylammonium hydroxides.

Examples of alkylamines include dimethylamine, trimethylamine, ethylamine, diethylamine, triethylamine, propylamine, isopropylamine, dipropylamine, diisopropylamine, tripropylamine, butylamine, isobutylamine, dibutylamine, diisobutylamine, tributylamine, pyridine, pentylamine, tripentylamine, N,N-dimethylaniline, cyclohexylamine, dicyclohexylamine, piperidine, picoline, morpholine, N-ethylmorpholine, diethylenetriamine, N,N-dimethylbenzylamine, tetramethylammonium hydroxide, tetraethylammonium hydroxide, tetrapropylammonium hydroxide and tetrabutylammonium hydroxide. Among these alkylamines, tertiary amines, such as triethylamine, tripropylamine, tributylamine and N-ethylmorpholine are preferred.

Various alkanolamines may be used in the present invention. Examples of alkanolamines include 2-aminoethanol, 3-aminopropanol, 2-(dimethylamino)ethanol, 2-(diethylamino)ethanol, diethanolamine, N-butyldiethanolamine, tripropanolamine, 1-diethylamino-2-propanol and 3-(dimethylamino)-1-propanol. Among these alkanolamines, dialkylalkanolamines, such as 2-(dimethylamino)ethanol, 1-diethylamino-2-propanol and 3-(dimethylamino)-1-propanol, are preferred.

When the acid value of carboxyl group-containing resin (A) is less than 10 mg KOH/g, the solubility and/or dispersibility of the carboxyl group-containing resin cannot be satisfactorily improved even when the resin is neutralized with an amine and it becomes necessary to use a large amount of an organic solvent. Therefore, it is preferred that the acid value of resin (A) be 10 mg KOH/g or more. If desired for further improving the dispersibility of the resin (A) in water, a surfactant may be added.

The neutralization of a carboxylic acid group-containing resin with an amine for preparing a carboxyl group-containing resin (A), which has good solubility and/or good dispersibility in an aqueous medium, can be performed by a conventional method. For example, the above-mentioned neutralization can be conducted by a method in which a reaction mixture, which is obtained by the polymerization for producing the carboxylic acid group-containing resin, is subjected to removal of a polymerization solvent by concentration to obtain a polymer; the obtained polymer is heated in a highly water-soluble solvent, such as isopropanol, isobutanol, butyl cellosolve or diethylene glycohol dimethylether, to dissolve the polymer therein; and the resultant solution of the polymer in the solvent is neutralized using an aqueous solution of an amine compound to obtain a neutralized polymer in an aqueous form. When the polymerization solvent used in the production of the carboxylic acid group-containing resin is a highly water-soluble solvent, it is possible to use the obtained resin as such, or it is possible to remove a part of the solvent and neutralize the polymer with an aqueous solution of an amine compound to obtain a neutralized polymer in an aqueous form.

In the crosslinking resin composition of the present invention, the weight ratio between carboxyl group-containing resin (A) and silicone compound (B) is not specifically limited. Silicone compound (B) may be mixed with carboxyl group-containing resin (A) in a weight ratio such that the epoxy groups of silicone compound (B) are present in a sufficient amount to react with all of the functional groups A of resin (A), thereby achieving a satisfactory curing. When the amount of silicone compound (B) is less than 1 part by weight, relative to 100 parts by weight of resin (A), a satisfactory curing of the crosslinking resin composition cannot be achieved, so that an ultimate cured resin has poor weatherability. When the amount of silicone compound (B) is 100 parts by weight or more, relative to 100 parts by weight of resin (A), not only does the amount of epoxy groups which are useless because they do not participate in the reaction with functional groups A of resin (A) become large, but the mechanical properties of an ultimate cured resin also tend to be poor.

Generally, it is preferred that the amount of silicone compound (B) be from 1 to 100 parts by weight, more preferably from 10 to 90 parts by weight, relative to 100 parts by weight of component (A).

It is preferred that the amount of medium (C) be from 10 to 80 weight %, based on the total weight of components (A),(B) and (C).

Especially when the crosslinking resin composition of the present invention is used as a material for coating compositions, such as a paint, the crosslinking resin composition may further comprise a light stabilizer having a structure represented by the following formula (VIII):

wherein each of $R^{10}$ to $R^{13}$ independently represents a $C_1$–$C_6$ alkyl group, and $R^{14}$ represents a hydrogen atom or a $C_1$–$C_6$ alkyl group.

Examples of commercially available light stabilizers having the above-mentioned structure include Sanol LS-770, Sanol LS-765, Sanol LS-2626, Sanol LS-1114 and Sanol LS-744 (all manufactured and sold by Sankyo Co., Ltd., Japan); Chimassorb 944LD (manufactured and sold by CIBA-GEIGY, Switzerland); and Adekastab LA-57, Adekastab LA-62 and Adekastab LA-67 (all manufactured and sold by ASAHI DENKA KOGYO K. K., Japan). These light stabilizers can be used individually or in combination. The amount of the light stabilizer is selected in the range of from 0.005 to 5% by weight, based on the weight of resin (A). In the production of the crosslinking resin composition of the present invention, the light stabilizer can be simply mixed with the other components of the resin composition of the present invention. Alternatively, the light stabilizer may be first mixed with at least one component selected from component (A) and component (B), and then all of the components may be mixed together.

The light stabilizer having a structure represented by formula (VIII) can also be used in a form such that the light stabilizer is bonded to carboxyl group-containing resin (A).

For example, when component (A) is an acrylic resin, the binding of the light stabilizer to the acrylic resin can be performed by a method in which component (A) is produced by polymerizing a mixture of a monomer for producing component (A) with a light stabilizer monomer. Examples of such light stabilizer monomers include 1,2,2,6,6-pentamethyl-4-piperidyl(meth)acrylate, 2,2,6,6-tetramethyl-4-piperidyl(meth)acrylate, 4-(meth)acryloylamino-2,2,6,6-tetramethylpiperidine and 4-(meth)acryloylamino-1,2,2,6,6-pentamethylpiperidine. The amount of the light stabilizer monomer is selected in the range of from 0.005% to 5% by weight, based on the total weight of all monomers.

As mentioned above, silicon compound (B) is used as a curing agent for the carboxylic acid group-containing resin.

For curing the crosslinking resin composition of the present invention, a curing catalyst may be used. It is preferred that the curing catalyst be at least one compound selected from the group consisting of ammonia, an amine compound, a phosphonium compound, a phosphine compound, a quaternary ammonium salt compound, an organometallic compound and a $BF_3$ complex. Examples of curing catalysts include amine compounds, such as triethylamine, tributylamine, 2-dimethylethanolamine, 2-methylimidazole, triethylenediamine, N,N-dimethylbenzylamine, 1,5-diazabicyclo[4.3.0]-nonene-5-ene and N-methylmorpholine; phosphonium compounds, such as tetra-n-butylphosphonium chloride, tetra-n-butylphosphonium bromide, benzyltriphenylphosphonium chloride, methyltriphenylphosphonium iodide and n-amylphosphonium bromide; quaternary ammonium salt compounds, such as tetrabutylammonium acetate, triethylbenzylammonium bromide, tetraethylammonium chloride and tetrabutylammonium bromide; phosphine compounds, such as tri-n-butylphosphine, tri-n-octylphosphine and triphenylphosphine; organometallic compounds, such as tris(acetylacetonato)aluminum and aluminum isopropoxide; $BF_3$ complexes, such as $BF_3$-ether complexes and $BF_3$-amine complexes; 3-aminopropyltrimethoxysilane; N-(2-aminoethyl)-3-aminopropyltrimethoxysilane; ammonia; and tetramethylammonium hydroxide.

When the crosslinking resin composition of the present invention is an aqueous crosslinking resin composition which contains as component (C) a medium composed mainly of water, in the production of the aqueous crosslinking resin composition, ammonia, amine or the like, are used for neutralizing the carboxyl group contained in component (A). In this case, the ammonia, amine or the like used for the neutralization can be utilized as a catalyst for promoting the cross-linking reaction. Therefore, unless it is especially desired to use an additional curing catalyst, incorporation of an additional curing catalyst can be omitted. However, if desired, the above-mentioned curing catalysts can be separately added. The above-mentioned curing catalysts can be used individually or in combination. The amount of the curing catalyst is selected in the range of from 0.05 to 5% by weight, based on the weight of resin (A).

When the catalyst is added immediately before use of the crosslinking resin composition, it is preferred that the catalyst be added to a mixture of components (A) and (B). However, the entire amount of the catalyst may be added to only one of the components (A) or (B), or divided amounts of the catalyst may be added to both components (A) and (B), respectively.

When the catalyst is added to any of the components and the resultant mixture is stored prior to production and use of the crosslinking resin composition, from the viewpoint of long-term storage, it is preferred that the catalyst be added to component (A). Alternatively, components (A) and (B) may be stored in the form of a mixture thereof, and the catalyst may be added to the mixture immediately before use of the crosslinking resin composition.

At the time of using the crosslinking resin composition of the present invention, if desired, additives can be added, such as an antioxidant, a viscosity modifier, a pigment, and a metal powder, e.g., aluminum paste. The curing temperature is selected in the range of from ambient temperature (for curing by spontaneous drying) to about 200° C. (for curing by baking).

When the crosslinking resin composition of the present invention is used as a coating composition, such as a paint, application of the coating composition onto a substrate can be conducted using conventional means for application, such as spray, roller, brush or the like.

As is apparent from the above, carboxyl group-containing resin (A) of the crosslinking resin composition of the present invention is free of an alkoxysilyl group which has high hydrolyzability. Therefore, the crosslinking resin composition of the present invention has excellent stability. Further, since silicone compound (B) contains at least two epoxy groups in one molecule thereof, which are capable of reacting with carboxyl groups, the silicone compound has high reactivity with the carboxyl groups of resin (A) and therefore, the crosslinking resin composition has excellent curing properties. Furthermore, since component (B) is free of both a silanol group and a hydrolyzable silyl group, even when the crosslinkable resin composition is contaminated with water, the water does not adversely affect the excellent stability of the crosslinking resin composition. Components (A) and (B) can be provided as a 2-pack crosslinking resin composition in which components (A) and (B) are stored separately from each other and adapted to be mixed in use thereof.

The novel crosslinking resin composition of the present invention is stable, and a cured resin obtained by a crosslinking reaction of components (A) and (B) has excellent features which are characteristic of a cured silicone structure-containing resin, such as excellent weatherability, stain resistance and acid resistance. Therefore, the crosslinking resin composition of the present invention is extremely useful as a material for coating compositions, such as a paint, a sealant and the like.

PREFERRED EMBODIMENT OF THE INVENTION

Hereinbelow, the present invention is described in more detail with reference to Referential Examples, Examples and Comparative Examples, which should not be construed as limiting the scope of the present invention.

In the following Referential Examples, Examples and Comparative Examples, the NMR spectrum was obtained using an NMR spectrometer, PMX60Si (manufactured and sold by JEOL Ltd., Japan), the infrared adsorption spectrum (IR) was obtained using a Fourier transform infrared spectrophotometer, FT/IR5300 (manufactured and sold by Japan Spectroscopic Co., Ltd., Japan), and the molecular weight was measured by gel permeation chromatography (GPC).

Various properties of a cured coating were evaluated in accordance with the following methods and evaluation criteria.

1) Appearance: evaluation was made by visually observing the cured coating.

○: good

Δ: slightly poor x: poor

2) Gloss: evaluation was made in accordance with JIS K5400-7.6 (60°).

○: 85% or more in terms of specular gloss

Δ: from 61 to 84% x: 60% or less

3) Gel %: measured by dipping the cured coating in acetone at 20° C. for 24 hours and determining and taking the residual weight ratio (%) as a gel % of the coating.

4) Pencil hardness: evaluation was made in accordance with JIS K5400-8.4.1 (measured by scratching the cured coating with a pencil).

5) Adhesion properties: evaluation was made in accordance with JIS K5400-8.5.2.

○: 10–8 score

Δ: 6–4 score

X: 2–0 score

6) Weatherability: evaluation was made in accordance with ASTM G-53, in which, upon 2,500-hour exposure, gloss retention (%) of the cured coating was determined.

○: 90% or more in terms of gloss retention x: less than 90%

7) Acid resistance: evaluation was made in accordance with JIS K5400-8.22.

8) Pot life: the period of time, for which a coating solution can be used, counted from the time of the preparation of the coating solution.

REFERENTIAL EXAMPLE 1

[Preparation of a resin solution containing the resin component (A)]

Resin solution (A-1)

50 g of toluene and 50 g of butyl acetate as solvents were charged in a 0.5-liter four-necked flask provided with a thermometer, an agitator, a cooling pipe and a nitrogen gas feeding pipe. Then, a dropping funnel, in which a mixture of 68 g of methyl methacrylate, 19.5 g of n-butyl acrylate, 5 g of methacrylic acid, 7.5 g of 2-hydroxyethyl methacrylate, 1.5 g of azobisisobutyronitrile (hereinafter referred to simply as "AIBN") had been introduced, was attached to the above-mentioned four-necked flask. Nitrogen gas was fed to the four-necked flask to thereby purge the flask with the nitrogen gas. Heating and stirring of the solvents in the flask were started. When the temperature of the solvent mixture reached 90° C., the monomer mixture contained in the dropping funnel was added dropwise to the solvents in the flask while maintaining the internal temperature of the flask at 90° C., to thereby effect a polymerization reaction. After completion of the addition, stirring was further conducted at 90° C. for 5 hours to thereby obtain resin solution (A-1).

The obtained resin solution (A-1) was analyzed by gas chromatography. As a result, it was found that the conversion of each of the methyl methacrylate, n-butyl acrylate, methacrylic acid and 2-hydroxyethyl methacrylate was 100%.

Further, the molecular weight of the resin contained in resin solution (A-1) was measured by gel permeation chromatography (hereinafter referred to simply as "GPC"). As a result, it was found that the resin had a number average molecular weight (hereinafter referred to simply as "$\overline{Mn}$") of 9,800 and a weight average molecular weight (hereinafter referred to simply as "$\overline{Mw}$") of 19,000. The resin had an acid value of 33 mg KOH/g and a hydroxyl value of 32 mg KOH/g.

Resin solution (A-2)

In substantially the same four-necked flask as used in the preparation of resin solution (A-1) were charged 50 g of toluene and 50 g of butyl acetate as solvents, and a monomer mixture having a formulation as described below was added dropwise to the solvent mixture in the flask at 90 ° C. while stirring, to thereby effect a polymerization reaction. After completion of the addition, stirring was further conducted at 90° C. for 5 hours to thereby obtain resin solution (A-2).

| | |
|---|---|
| methyl methacrylate | 70.0 g |
| n-butyl acrylate | 20.0 g |
| methacrylic acid | 10.0 g |
| AIBN | 1.5 g |

The resin contained in the obtained resin solution (A-2) had an $\overline{Mn}$ of 10,600 and an acid value of 64 mg KOH/g.

Resin solution (A-3)

In substantially the same four-necked flask as used in the preparation of resin solution (A-1) were charged 50 g of toluene and 50 g of butyl acetate as solvents, and a monomer mixture having a formulation as described below was added dropwise to the solvents in the flask at 90° C. while stirring, to thereby effect a polymerization reaction. After completion of the addition, stirring was further conducted at 90° C. for 5 hours to thereby obtain resin solution (A-3).

| | |
|---|---|
| methyl methacrylate | 55.0 g |
| n-butyl acrylate | 30.0 g |
| methacrylic acid | 10.0 g |
| 2-hydroxyethyl methacrylate | 5.0 g |
| AIBN | 1.5 g |

The resin contained in the obtained resin solution (A-3) had an Mn of 11,700, an acid value of 64 mg KOH/g and a hydroxyl value of 22 mg KOH/g.

Resin solution (A-4)

In substantially the same four-necked flask as used in the preparation of resin solution (A-1) were charged 100 g of diethylene glycol dimethyl ether and 50 g of isopropanol as solvents, and a monomer mixture having a formulation as described below was added dropwise to the solvent mixture in the flask at 90° C. while stirring, to thereby effect a polymerization reaction. To the resultant reaction mixture, the mixture of 0.17 g of AIBN and 3 g of diethylene glycol dimethyl ether was further dropwise added at 90° C. while stirring. After completion of the addition, stirring was further conducted at 90° C. for 5 hours to thereby obtain resin solution (A-4).

| | |
|---|---|
| methyl methacrylate | 50.2 g |
| n-butyl acrylate | 29.4 g |
| cyclohexyl methacrylate | 5.0 g |
| methacrylic acid | 15.4 g |
| AIBN | 3.0 g |

The resin contained in the obtained resin solution (A-4) had an $\overline{Mn}$ of 10,000 and an acid value of 100 mg KOH/g.

REFERENTIAL EXAMPLE 2

[Preparation of an aqueous resin solution containing a resin as component (A)]

Aqueous resin solution (A-5)

Resin solution (A-1) obtained above was added to a 5-time amount of n-hexane to obtain a highly viscous resin solution. The obtained resin solution was dried at 70 ° C. for 2 hours in vacuum to remove the solvents completely, so that a solid resin was obtained. 50 g of the obtained solid resin was dissolved in 25 g of butyl cellosolve under heating. To the resultant mixture was added 150 g of an aqueous solution containing 3.2 g of triethylamine, to thereby obtain aqueous resin solution (A-5).

Aqueous resin solution (A-6)

Resin solution (A-2) obtained above was treated in substantially the same manner as described above in connection with the preparation of aqueous resin solution (A-5), to thereby obtain a solid resin. 50 g of the obtained solid resin was dissolved in 25 g of butyl cellosolve with heating. To the resultant mixture was added 125 g of an aqueous solution containing 5.4 g of N,N-dimethyl ethanolamine, to thereby obtain aqueous resin solution (A-6).

REFERENCE EXAMPLE 3

[Synthesis of component (B)]

Silicone compound (B-1)

In a 300-ml four-necked flask provided with a thermometer, a magnetic stirrer, a cooling pipe and a nitrogen gas feeding pipe were charged 0.10 g of a 8% isopropanol solution of chloroplatinic acid, 77.1 g of allyl glycidyl ether and 15.0 g of 1,3,5,7-tetramethylcyclotetrasiloxane, and a reaction was performed at 100° C. for 3 hours. The resultant reaction mixture was taken out, and subjected to distillation at a temperature of not more than about 80° C. in vacuum to remove the solvents completely. Thus, 41.9 g of a silicone compound (B-1) having low viscosity was obtained. The obtained silicone compound (B-1) had an $\overline{Mn}$ of 700 as measured by GPC. When the silicone compound (B-1) was added to a 2N NaOH solution, no hydrogen gas was generated, and 100% of the Si—H groups were reacted. This silicone compound had 4 epoxy groups per molecule thereof.

Silicone compound (B-2)

(1) Synthesis of an intermediate a;

240 g of isopropyl ether and 480 g of purified water were charged in a 2-liter four-necked flask provided with a thermometer, a magnetic stirrer, a cooling pipe for conducting cooling with dry ice and ethanol, and a nitrogen gas feeding pipe. Stirring of the solvents in the flask was started. Nitrogen gas was fed to the four-necked flask to thereby purge the flask with the nitrogen gas. A dropping funnel, in which 245.6 g of methyldichlorosilane had been introduced, was attached to the above-mentioned four-necked flask. Then, the methyldichlorosilane in the dropping funnel was added dropwise to the solvent mixture in the flask over 90 minutes, while maintaining the internal temperature of the flask at 15° to 20° C., to thereby effect a reaction. After completion of the addition, the resultant reaction mixture was separated into an organic phase and an aqueous phase in a separation funnel. 90 g of isopropyl ether was added to the separated aqueous phase to perform extraction to obtain an organic phase. The obtained organic phase was added to the organic phase obtained by the previous extraction, and the resultant mixture was washed 3 times using about 300 ml of water. The amount of the organic phase obtained after the washing was 395 g. 197 g of the obtained organic phase was charged in a simple distillation apparatus for vacuum distillation. A distillation was first performed under atmospheric pressure to remove 113 g of unreacted isopropyl ether and then, the pressure was gradually decreased until the pressure became 2 mmHg and the bottom temperature became 160° C., thereby obtaining 64.72 g of a distillate containing siloxane compounds (hereinafter referred to as "intermediate a"), and 18.1 g of a residue at the bottom of the distillation apparatus. The obtained distillate containing siloxane compounds (intermediate a) was analyzed by gas chromatography. As a result, it was found that the distillate (intermediate a) had a 1,3,5,7-tetramethylcyclotetrasiloxane content of 37%, a 1,3,5,7,9-pentamethylcyclosiloxane content of 19% and a total content of other cyclosiloxanes having $Si_6$-$Si_{12}$ of 15%.

(2) Synthesis of silicone compound (B-2):

In a 200-ml four-necked flask provided with a thermometer, a magnetic stirrer, a cooling pipe and a dropping funnel were charged 13 mg of a 8% isopropanol solution of chloroplatinic acid and 62.3 g of allyl glycidyl ether, followed by stirring at 65° C. A mixture of 32.33 g of the intermediate a obtained above and 18.7 g of isopropyl ether was added dropwise to the mixture in the flask using the dropping funnel, to effect a reaction at 80° C. for 1 hour. The resultant reaction mixture was taken out, and subjected to distillation at a temperature of not more than about 80° C. in vacuum to remove the solvents completely. Thus, 64.5 g of a silicone compound (B-2) having low viscosity was obtained. The obtained silicone compound (B-2) had an $\overline{Mn}$ of 720 as measured by GPC. When the silicone compound (B-2) was added to a 2N NaOH solution, no hydrogen gas was generated, and 100% of the Si—H groups were reacted. From the $\overline{Mn}$ value, it was determined that this silicone compound had about 4.1 epoxy groups on the average per molecule thereof.

Silicone compound (B-3)

In a 300-ml four-necked flask provided with a thermometer, a magnetic stirrer, a cooling pipe and a nitrogen gas feeding pipe were charged 12 mg of a 8% isopropanol solution of chloroplatinic acid, 60.0 g of 5-epoxy-1-hexene and 52.0 g of isopropyl ether. 24.6 g of 1,3,5,7-tetramethylcyclotetrasiloxane was added dropwise to the mixture in the flask at 65° C., and a reaction was performed at 80° C. for 1 hour. The resultant reaction mixture was treated in substantially the same manner as described above in connection with the preparation of silicone compound (B-2), to thereby obtain 63.0 g of a silicone compound (B-3) having low viscosity. This silicone compound had 4 epoxy groups per molecule thereof.

Silicone compounds (B-4) and (B-5):

(1) Synthesis of intermediates b and c:

In a 300-ml four-necked flask provided with a thermometer, a magnetic stirrer and a cooling pipe were charged 100 g of 1,3,5,7-tetramethylcyclotetrasiloxane, 100 g of hexamethyldisiloxane and 1.3 g of sulfuric acid, and a reaction was performed at 20° C. for 2 hours while stirring. The resultant reaction mixture was washed with water, using a separation funnel, until the washings became neutral. The resultant organic phase was purified by repeatedly performing a vacuum distillation, thereby obtaining straight chain siloxane compounds (intermediate b and c) represented by the following formula:

wherein p represents an integer of 4 for the intermediate b and an integer of 5 for the intermediate c.

(2) Synthesis of silicone compound (B-4):

In a 100-ml four-necked flask provided with a thermometer, a magnetic stirrer, a cooling pipe and a nitrogen gas feeding pipe were charged 9 mg of a 8% isopropanol solution of chloroplatinic acid and 40.0 g vinylcyclohexene oxide as solvents. A mixture of 13.0 g of the intermediate b obtained above and 13.0 g of isopropyl ether was added dropwise to the solvent mixture in the flask at 65° C., and a reaction was performed at 80° C. for 1 hour. The resultant reaction mixture was treated in substantially the same manner as described above in connection with the preparation of silicone compound (B-3), to thereby obtain 30 g of silicone compound (B-4) having low viscosity. This silicone compound had 4 epoxy groups per molecule thereof.

(3) Synthesis of silicone compound (B-5):

In a 100-ml four-necked flask provided with a thermometer, a magnetic stirrer, a cooling pipe and a nitrogen gas feeding pipe were charged 9 mg of a 8% isopropanol solution of chloroplatinic acid, and 40.0 g allyl glycidyl ether and 13.3 g of toluene. 13.1 g of the intermediate c was added dropwise to the mixture in the flask at 65° C., and a reaction was conducted at 80° C. for 1 hour. The resultant reaction mixture was treated in substantially the same manner as described above in connection with silicone compound (B-3), to thereby obtain 30 g of silicone compound (B-5) having low viscosity. This silicone compound had 5 epoxy groups per molecule thereof.

REFERENCE EXAMPLE 4

[Synthesis of comparative compounds]

Comparative resin solution (A-1)

As a comparative compound, a vinyl copolymer having alkoxysilyl groups was synthesized by the following method.

In substantially the same four-necked flask as used in the preparation of resin solution (A-1) were charged 50 g of toluene and 50 g of butyl acetate as solvents, and a monomer mixture having a formulation as described below was added dropwise to the solvent mixture at 90° C. while stirring, to thereby effect a polymerization reaction. After completion of the addition, stirring was further conducted at 90° C. for 5 hours to thereby obtain a vinyl copolymer as comparative resin solution (A-1).

| | |
|---|---|
| methyl methacrylate | 51.0 g |
| n-butyl acrylate | 28.0 g |
| methacrylic acid | 4.0 g |
| 3-methacryloxypropyl-trimethoxysilane | 17.0 g |
| AIBN | 1.5 g |

Comparative silicone compound (B-1)

In a 1-liter four-necked flask provided with a thermometer, a magnetic stirrer and a cooling pipe were charged 6.8 g of methyltrimethoxysilane, 236.2 g of 3-glycidoxypropyltrimethoxysilane, 60.0 g of water, 2 g of a 3% hydrochloric acid solution and 300 g of metha- nol, and a reaction was conducted at 60° C. for 2 hours. The resultant reaction mixture was taken out, and subjected to distillation at 60° C. in vacuum to thereby remove the solvents completely. Thus, a silicone compound [comparative silicone compound (B-1)] comprising a hydrolyzable silyl group (Si—OMe, wherein 'Me' means a methyl group) was obtained. The obtained silicone compound had an Mn of 1,700 as measured by GPC. When the silicone compound was stored at room temperature for about 2 months, it was observed that the silicone compound was in the state of a gel and was insoluble in an organic solvent, such as acetone.

Example 1

100 parts by weight of the resin solutions (A-1) to (A-3) (50 parts by weight in terms of the resin) as component (A) were individually blended with 10 parts by weight of each of the silicone compounds (B-1) to (B-5) as component (B), to thereby obtain resin mixtures, and water was added to each of the resin mixtures in an amount of 6,000 ppm by weight, based on the weight of the each resin mixture. The resultant mixtures were stored at room temperature for 1 month. After that period of time, each of the mixtures was observed with respect to the change of viscosity. No marked increase in viscosity was observed.

Comparative Example 1

Substantially the same procedure as in Example 1 was repeated, except that the resin solution [comparative resin solution (A-1)] was used instead of the resin solution (A-1). The mixtures obtained by blending component (B) underwent gellation within one month.

Examples 2 to 11

A resin solution selected from (A-1) to (A-4) as component (A), a silicone compound selected from (B-1) to (B-5) as component (B), a curing catalyst selected from catalysts a to g (a: tetrabutylammonium acetate, b: N,N-dimethylbenzylamine, c: tetrabutylphosphonium chloride, d: triphenylphosphine, e: aluminum acetylacetonate, g: triethylamine) and SANOL LS-765 (a light stabilizer, manufactured and sold by Sankyo Corporation Limited, Japan) were blended in the respective amounts indicated in Table 1, to thereby obtain coating compositions. The viscosity of the obtained coating composition was adjusted to a value of 15 seconds of Ford viscosity cup No. 4 (ASTM D-1200) using, as a thinner, a solution obtained by mixing toluene, butyl acetate and diethylene glycol dimethyl ether in the weight ratio of 5:5:1. The resultant coating composition was coated. The coating was cured by heat at 120 ° C. for 30 minutes. The obtained cured coating was evaluated. Results are shown in Table 2.

Comparative Examples 2 to 4

A resin solution selected from (A-1) and (A-4) as component (A), a silicone compound selected from comparative silicone compound (B-1) and 2-(3,4 epoxycyclohexyl) ethyltrimethoxysilane (hereinafter referred to as ECTMS) as component (B) were blended in the amounts indicated in Table 1, to thereby obtain coating compositions. The coating composition was treated in the same manner as in Example 2. The obtained cured coating was evaluated. Results are shown in Table 2.

TABLE 1

| Components | \multicolumn{10}{c}{Example Nos. and Amounts of Components (parts by weight)} | | | | | | | | | | \multicolumn{3}{c}{Comparative Example Nos. and Amounts of Components (parts by weight)} | | |
|---|---|---|---|---|---|---|---|---|---|---|---|---|---|
| | 2 | 3 | 4 | 5 | 6 | 7 | 8 | 9 | 10 | 11 | 2 | 3 | 4 |
| (1) A-1 | | 80 | | | | | | | | 87 | 80 | | 80 |
| (2) A-2 | 80 | | 80 | | | 80 | | | | | | | |
| (3) A-3 | | | | 80 | | | 80 | 80 | 80 | | | 80 | |
| (4) A-4 | | | | | 75 | | | | | | | | |
| B-1 | 20 | 20 | 20 | 20 | 25 | | | | | | | | |
| B-2 | | | | | | 20 | | | | 13 | | | |
| B-3 | | | | | | | 20 | | | | | | |
| B-4 | | | | | | | | 20 | | | | | |
| B-5 | | | | | | | | | 20 | | | | |
| Comparartive B-1 | | | | | | | | | | | 20 | 20 | |
| ECTMS | | | | | | | | | | | | | 20 |
| Catalyst a | | 2 | | | | 2 | 2 | | 2 | | | | |
| Catalyst b | | | 2 | | | | | 2 | | | | | 2 |
| Catalyst c | | | | 2 | | | | | | | | | |
| Catalyst d | 2 | | | | 2 | | | | | | | | |
| Catalyst e | | | | | | | | | | | 2 | 2 | |
| Catalyst g | | | | | | | | | | 3 | | | |
| SANOL LS-765 | | | | | | | | | | 0.1 | | | |

Note; as for (1) to (4), the amount of Component indicates the amount of the solid contained therein.

TABLE 2

| Properties of cured Coatings | Example Nos. and Results of Evaluation | | | | | | | | | | Comparative Example Nos. and Results of Evaluation | | |
|---|---|---|---|---|---|---|---|---|---|---|---|---|---|
| | 2 | 3 | 4 | 5 | 6 | 7 | 8 | 9 | 10 | 11 | 2 | 3 | 4 |
| Appearance | o | o | o | o | o | o | o | o | o | o | x | x | o |
| Gloss | o | o | o | o | o | o | o | o | o | o | x | x | o |
| Gel % | 98 | 94 | 96 | 97 | 98 | 96 | 97 | 92 | 94 | 95 | 50 | 30 | 74 |
| Pencil hardness | 2H | H | 2H | 2H | 2H | H | 2H | HB | H | F | B | 2B | H |
| Adhesiveness | o | o | o | o | o | o | o | o | o | o | o | o | o |
| Weatherability | o | o | o | o | o | o | o | o | o | o | x | x | x |
| Acid Resistance | o | o | o | o | o | o | o | o | o | o | Δ | Δ | o |

Examples 12 to 13

To 500 parts by weight of n-hexane were added 100 parts by weight of a resin solution (A-2) as component (A). The obtained solid was dried in vacuuo at 100° C. for 2 hours, to thereby remove the solvent. Thus, a solid resin of (A-2) freed of solvent was obtained. The obtained solid resin as component (A), silicone compound (B-3) as component (B), N,N-dimethylbenzylamine as a curing catalyst, and solvents (T: toluene, I: isopropanol, BuA: n-butyl acetate, DG: diethyleneglycol dimethylether) were used in the respective amounts indicated in Table 3 to prepare coating compositions. The prepared coating composition was coated, and then, cured by heat at 120° C. for 30 minutes. The obtained cured coating was evaluated. Results are shown in Table 3.

Examples 14 to 15

Example 12 and 13 were repeated except that only-one-type of organic solvent was used. The obtained cured coating was evaluated. Results are shown in Table 3.

TABLE 3

| Example Nos. | Amount of Component (A) (Solid Resin) | Amount of Component (B) | Amount of Curing Catalyst | Amount of Solvent T | Amount of Solvent I | Amount of Solvent BuA | Amount of Solvent DG | Appearance | Gloss | Gel % |
|---|---|---|---|---|---|---|---|---|---|---|
| Example 12 | 80 parts | 20 parts | 2 parts | 100 parts | 0 part | 100 parts | 100 parts | o | o | 97 |
| Example 13 | 75 parts | 25 parts | 2 parts | 100 parts | 50 parts | 50 parts | 100 parts | o | o | 97 |
| Example 14 | 80 parts | 20 parts | 2 parts | 300 parts | 0 part | 0 part | 0 part | o | óñ | 90 |
| Example 15 | 75 parts | 25 parts | 2 parts | 0 part | 0 part | 300 parts | 0 part | o | óñ | 95 |

Examples 16 to 20

80 parts by weight of resin solution (A-2) as component (A), based on the weight of the solid resin, 20 parts by weight of silicone compound (B-1) as a component (B) and 2% by weight of curing catalysts (a: tetrabutylammonium acetate, b: N,N-dimethylbenzylamine, c: tetrabutylphosphonium chloride, d: tri-phenylphosphine, f: tetramethyl ammoniumhydroxyde) relative to the weight of the solid contained in components (A) and (B) were blended, to thereby obtain a coating composition. The viscosity of the obtained coating composition was adjusted to a value of 15 seconds of Ford viscosity cup No. 4, using, as a thinner, a solution obtained by mixing toluene, butyl acetate and diethylene glycol dimethyl ether in the weight ratio of 5:5:1. The obtained coating composition was coated, and then, cured at room temperature for 7 days or 14 days. The obtained cured coating was evaluated. Results are shown in Table 4.

TABLE 4

| Example Nos. | Component (A) | Component (B) | Curing Catalyst | Appearance | Gel % 7 days | Gel % 14 days |
|---|---|---|---|---|---|---|
| Example 16 | A-2 | B-3 | a | o | 94 | 96 |
| Example 17 | A-2 | B-3 | b | o | 92 | 95 |
| Example 18 | A-2 | B-3 | c | o | 93 | 96 |
| Example 19 | A-2 | B-3 | d | o | 88 | 93 |
| Example 20 | A-2 | B-3 | f | o | 93 | 95 |

Examples 21 to 23

A resin solution selected from (A-5) and (A-6) as component (A), a silicone compound selected from (B-1) and (B-2) as component (B) and a light stabilizer, SANOL LS-765 were blended in the amounts indicated in Table 5, to thereby prepare coating compositions. The prepared coating composition was coated using an applicator, to thereby obtain a coating. The obtained coating was allowed to stand at room temperature for 1 hour, and then, cured by heat at 120° C. for 30 minutes. The obtained cured coating was evaluated. Results are shown in Table 6.

TABLE 5

| Components | Example Nos. and Amount of Components (parts by weight) | | |
|---|---|---|---|
| | 21 | 22 | 23 |
| A-5 | | | 83 |
| A-6 | 80 | 90 | |
| B-1 | 20 | | 17 |

TABLE 5-continued

| | Example Nos. and Amount of Components (parts by weight) | | |
|---|---|---|---|
| Components | 21 | 22 | 23 |
| B-2 | | 10 | |
| GPTMS | | | |
| Stannous Catalyst | | | |
| Almina Catalyst | | | |
| Purified Water | | | |
| SANOL LS-765 | | 0.1 | |

TABLE 6

| Properties of | Example Nos. and Results of Evaluation | | |
|---|---|---|---|
| Cured Coatings | 21 | 22 | 23 |
| Appearance | 0 | 0 | 0 |
| Gloss | 0 | 0 | 0 |
| Gel % | 93 | 93 | 94 |
| Pencil hardness | 2H | H | H |
| Adhesiveness | 0 | 0 | 0 |
| Weatherability | 0 | 0 | 0 |
| Acid Resistance | 0 | 0 | 0 |
| Pot life (hr) | 5< | 5< | 5< |

Industrial Applicability

The crosslinking resin composition of the present invention not only exhibits excellent storage stability, but is also capable of providing, upon being crosslinked, a cured resin having excellent gloss, weather-ability, acid resistance, solvent resistance, water repellency and stain resistance. Therefore, the cross-linking resin composition of the present invention can be advantageously used as a material for providing coating compositions, such as paints, sealants and the like, especially for providing a high performance coating composition to be used as, for example, a topcoating and an intercoating material for use in production of an automobile, a coating material for repairing an automobile, a coating material for architectures, a coating material for a building material, a coating material for plastics and a coating material for various metallic products.

We claim:

1. A crosslinking resin composition comprising:

(A) a carboxyl group-containing resin having a number average molecular weight of from 1,000 to 40,000 g/mole and an acid value of from 10 to 400 mg KOH/g;

(B) a cyclic or chain silicone compound as a curing agent, having a number average molecular weight of from 350 to 8,000 g/mole and containing at least two epoxy groups in one molecule thereof, wherein said silicone compound is free of a silanol group, a hydrolyzable silyl group or a vinyl polymer structure, and wherein said silicone compound has a siloxy group-containing skeleton represented by a formula selected from the group consisting of the following formulae (I) and (II):

wherein n is an integer of from 3 to 20, and

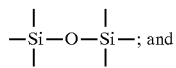

(C) a medium selected from the group consisting of water and an organic solvent.

2. The crosslinking resin composition according to claim 1, wherein said carboxyl group-containing resin (A) is at least one resin selected from the group consisting of an acrylic resin, a polyester resin and a fluorine-containing resin.

3. The crosslinking resin composition according to any one of claims 1 or 2, wherein said silicone compound (B) has no functional groups capable of reacting with a carboxyl group other than said epoxy groups.

4. The crosslinking resin composition according to claim 3, wherein said silicone compound (B) is at least one silicone compound selected from the group consisting of a cyclic silicone compound represented by the following formula (III):

wherein m is an integer of from 3 to 16, each $R^1$ independently represents a $C_1$–$C_{10}$ alkyl group and each Ep independently represents a group represented by a formula selected from the group consisting of the following formulae (1), (2) and (3):

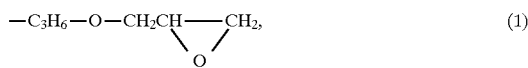

wherein j is an integer of from 2 to 6; and a chain silicone compound represented by the following formula (IV):

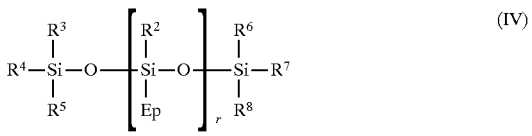

wherein each of $R^2$ to $R^8$ independently represents a $C_1$–$C_{10}$ alkyl group, each Ep is as defined above for formula (III) and r is an integer of from 3 to 16.

5. The crosslinking resin composition according to claim 1, wherein said silicone compound (B) is obtained by a hydrosilylation reaction of a Si—H-containing silane compound with an epoxy group-containing compound having a carbon-carbon double bond, said Si—H-containing silane compound being represented by a formula selected from the group consisting of the following formulae (V), (VI) and (VII):

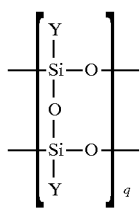 (V)

wherein each Y independently represents a hydrogen atom or a $C_1$–$C_{10}$ alkyl group, with the proviso that at least two Ys in one molecule of the Si—H-containing silane compound are hydrogen atoms, and q is an integer of from 2 to 10;

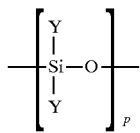 (VI)

wherein each Y independently represents a hydrogen atom or a $C_1$–$C_{10}$ alkyl group, with the proviso that at least two Ys in one molecule of the Si—H-containing silane compound are hydrogen atoms, and p is an integer of from 3 to 20; and

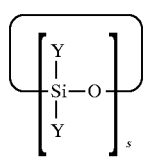 (VII)

wherein each Y independently represents a hydrogen atom or a $C_1$–$C_{10}$ alkyl group, with the proviso that at least two Ys in one molecule of the Si—H-containing silane compound are hydrogen atoms, and s is an integer of from 3 to 16.

6. The crosslinking resin composition according to any one of claims 1 or 2, which further comprises a curing catalyst.

7. The crosslinking resin composition according to claim 6, wherein said curing catalyst is at least one compound selected from the group consisting of ammonia, an amine compound, a phosphonium compound, a phosphine compound, a quaternary ammonium salt compound, an organometallic compound and a $BF_3$ complex.

8. The crosslinking resin composition according to any one of claims 1 or 2, which further comprises a light stabilizer containing a structure represented by the following formula (VIII):

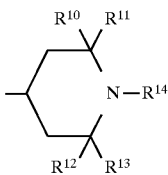 (VIII)

wherein each of $R^{10}$ to $R^{13}$ independently represents a $C_1$–$C_6$ alkyl group, and $R^{14}$ represents a hydrogen atom or a $C_1$–$C_6$ alkyl group.

9. A method for curing a carboxyl group-containing resin, which comprises reacting a carboxyl group-containing resin having a number average molecular weight of from 1,000 to 40,000 g/mole and an acid value of from 10 to 400 mg KOH/g with a cyclic or chain silicone compound having a number average molecular weight of from 350 to 8,000 g/mole and containing at least two epoxy groups in one molecule thereof, wherein said silicone compound is free of a silanol group, a hydrolyzable silyl group or a vinyl polymer structure, and wherein said silicone compound is at least one silicone compound selected from the group consisting of the following compounds (1) to (4):

(1) a cyclic silicone compound represented by the following formula (III):

 (III)

wherein m is an integer of from 3 to 16, each $R^1$ independently represents a $C_1$–$C_{10}$ alkyl group and each Ep independently represents a group represented by a formula selected from the group consisting of the following formulae (1), (2) and (3):

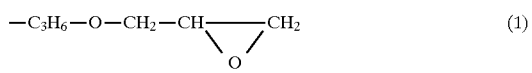 (1)

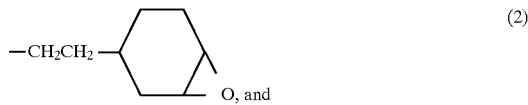 (2)

 (3)

wherein j is an integer of from 2 to 6, (2) a chain silicone compound represented by the following formula (IV):

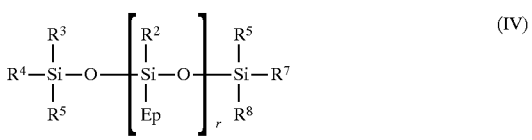 (IV)

wherein each of $R^2$ to $R^8$ independently represents a $C_1$–$C_{10}$ alkyl group, each Ep is as defined above for formula (III) and r is an integer of from 3 to 16, (3) a silicone compound obtained by a hydrosilylation reaction of a Si—H-containing silane compound with an epoxy group-containing compound having a carbon-carbon double bond, said Si—H-containing silane compound being represented by a formula selected from the group consisting of the following formulae (V), (VI) and (VII):

 (V)

wherein each Y independently represents a hydrogen atom or a $C_1$–$C_{10}$ alkyl group, with the proviso that at least two Ys in one molecule of the Si—H-containing silane compound are hydrogen atoms, and q is an integer of from 2 to 10;

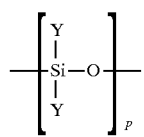

(VI)

wherein each Y independently represents a hydrogen atom or a $C_1$–$C_{10}$ alkyl group, with the proviso that at least two Ys in one molecule of the Si—H-containing silane compound are hydrogen atoms, and p is an integer of from 3 to 20; and

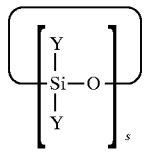

(VII)

wherein each Y independently represents a hydrogen atom or a $C_1$–$C_{10}$ alkyl group, with the proviso that at least two Ys in one molecule of the Si—H-containing silane compound are hydrogen atoms, and s is an integer of from 3 to 16, and (4) 1,3-bis(3-glycidoxypropyl)-1,1,3,3-tetramethyldisiloxane.

10. The crosslinking resin composition according to any one of claims 1 or 2, wherein said carbonyl group-containing resin (A) has a stabilizer bonded thereto, said stabilizer containing a structure represented by the following formula (VIII):

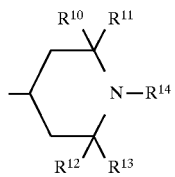

(VIII)

wherein each of $R^{10}$ to $R^{13}$ independently represents a $C_1$–$C_6$ alkyl group, and $R^{14}$ represents a hydrogen atom or a $C_1$–$C_6$ alkyl group.

* * * * *

UNITED STATES PATENT AND TRADEMARK OFFICE
CERTIFICATE OF CORRECTION

PATENT NO. : 5,773,497

DATED : June 30, 1998

INVENTOR(S) : UEYANAGI et al.

It is certified that an error appears in the above-identified patent and that said Letters Patent is hereby corrected as shown below:

(1) In column 26, lines 10-15, "$\begin{bmatrix} R^1 \\ | \\ Si-O \\ | \\ Ep \end{bmatrix}_m$" should be changed to ----.

Signed and Sealed this

Second Day of March, 1999

Attest:

Q. TODD DICKINSON

Attesting Officer

Acting Commissioner of Patents and Trademarks